(12) United States Patent
Martin

(10) Patent No.: US 8,783,446 B2
(45) Date of Patent: Jul. 22, 2014

(54) TAIL DRIVE ASSEMBLY

(75) Inventor: Derek Martin, South Eldorado, IL (US)

(73) Assignee: American Equipment & Machine, Inc., Pepper Pike, OH (US)

( * ) Notice: Subject to any disclaimer, the term of this patent is extended or adjusted under 35 U.S.C. 154(b) by 0 days.

(21) Appl. No.: 13/429,075

(22) Filed: Mar. 23, 2012

(65) Prior Publication Data

US 2012/0241293 A1 Sep. 27, 2012

Related U.S. Application Data

(60) Provisional application No. 61/467,706, filed on Mar. 25, 2011.

(51) Int. Cl.
*B65G 19/18* (2006.01)
*B65G 19/28* (2006.01)

(52) U.S. Cl.
USPC ................... 198/735.3; 198/735.1

(58) Field of Classification Search
CPC ........ E21C 35/12; B65G 19/28; B65G 19/10; B65G 19/26; B65G 19/287; B65G 19/20
USPC ........................ 198/735.3, 728, 810.04; 7/170
See application file for complete search history.

(56) References Cited

U.S. PATENT DOCUMENTS

| | | | | |
|---|---|---|---|---|
| 3,458,899 A * | 8/1969 | Heilbrunn | ...................... | 425/377 |
| 4,566,587 A * | 1/1986 | Gorlov et al. | ................. | 198/732 |
| 4,667,811 A * | 5/1987 | Schoop et al. | ............. | 198/735.3 |
| 6,035,997 A * | 3/2000 | Heninger et al. | .......... | 198/735.2 |
| 6,401,912 B1 | 6/2002 | Bandy | | |
| 2006/0249977 A1* | 11/2006 | Stephenson et al. | .......... | 296/104 |
| 2007/0270045 A1* | 11/2007 | Korczynski et al. | .......... | 439/723 |
| 2008/0277244 A1* | 11/2008 | Antoline et al. | ............. | 198/617 |
| 2010/0270128 A1 | 10/2010 | Hill | | |
| 2012/0038204 A1* | 2/2012 | Klabisch et al. | ........... | 299/34.02 |

FOREIGN PATENT DOCUMENTS

| | | |
|---|---|---|
| WO | 2010-015961 | 2/2010 |
| WO | 2010-023637 | 3/2010 |

OTHER PUBLICATIONS

Notification of Transmittal of the International Search Report and the Written Opinion of the International Searching Authority, or the Declaration for Application No. PCT/US2012/030434, mailed Oct. 10, 2012.

* cited by examiner

*Primary Examiner* — Ramya Burgess
*Assistant Examiner* — Lester Rushin
(74) *Attorney, Agent, or Firm* — McGuireWoods, LLP

(57) ABSTRACT

An assembly for replacing the top sigma sections in a tail drive of an armored face conveyor is described. The assembly joins the sigmas to the top deck in a single unit, providing more robust mounting support. The assembly may also include one or more mounting pins, as well as one or more access doors. The assembly requires no welding to the tail drive.

9 Claims, 6 Drawing Sheets

TAIL DRIVE ASSEMBLY

CROSS-REFERENCE TO RELATED APPLICATIONS

This application claims benefit and priority to U.S. Provisional Application No. 61/467,706 filed Mar. 25, 2012, the disclosure of which is incorporated by reference herein in its entirety.

BACKGROUND OF THE PRESENT DISCLOSURE

1. Field of the Present Disclosure

The present disclosure is directed to a system and method for replacing certain components of a tail drive in an armored face conveyor that may be operated as part of a mechanized longwall mining operation.

2. Related Art

Longwall mining is a form of coal mining that involves removing a long slice of a wall of coal at substantially the same time. The slice may be, for example, from about 0.5 m to 2 m, depending on the longwall mining equipment.

Longwall mining equipment typically includes a shearer (or power loader), an armored face conveyor (AFC), and a plurality of hydraulic jacks, which are commonly referred to as powered roof supports, shields or chocks. The shearer comprises a main body, a housing that holds the electrical components, and a plurality of tractive motive units to move the shearer along a coalface. The shearer may weigh about 75-120 tons. The machine may further include one or more hydraulic pumping units. At either end of the main body of the shearer are fitted ranging arms, which can be ranged vertically up or down by means of hydraulic rams, and onto which are mounted shearer cutting drums that may be fitted with about 30-60 cutting picks. Within the ranging arms may be housed very powerful electric motors (e.g., typically up to 850 kW) which transfer their power through a series of lay gears within the body the arms to the drum mounting locations at the extreme ends of the ranging arms where the cutting drums are. The cutting drums may rotate at a speed of about 20-50 revs/min to cut the mineral from coal seam.

Modern mechanized longwall mining operations may use one or more shearers to remove coal from the face of a coal seam to a depth of, for example, about 0.5 to 2 meters. The coalface may be hundreds of meters wide, and the coal seam may have a depth of hundreds or thousands of meters. The shearer(s) may move along the length of the face carried on the AFC.

The AFC may include a chainless haulage system that resembles, for example, a rugged rack and pinion system specially developed for mining. The shearer typically moves on the AFC at a speed of about 0 to 30 m per minute, depending on cutting conditions. The AFC may be placed in front of the powered roof supports and configured to capture and remove the coal cut by the shearing action of the rotating drums cutting into the coal seam. The AFC may further include a scraper chain conveyor that carries the cut coal to a main gate, where it is loaded onto a network conveyor for transport to the surface, outside of the coal mine. At the main gate, the coal is typically reduced in size, for example, by a crusher, and loaded onto a conveyor by, for example, a beam stage loader.

Each of the hydraulic jacks may be about 1.75 m wide and extendable to a cutting height of up to about 6 meters. The hydraulic jacks may be placed in a long line, side-by-side for up to about 400 meters in length in order to support the roof of a coalface. An individual jack may weigh about 30-40 tons and have a yield rating of about 600-1250 tons. The hydraulic jacks may hydraulically advance about 1 meter at a time.

During mining, a shearer moves along the AFC, cutting coal from a wall as it travels along the AFC, which is removed from the cutting area to create a cavity. The powered roof supports move forward into the newly created cavity. As mining progresses and the entire longwall mining apparatus progresses through the seam, the goaf increases. This goaf may collapse under the weight of the overlying strata. In some situations, the strata may be approximately 2.5 times the thickness of the coal seam removed and may collapse with the beds above settling onto the collapsed goaf.

Additional equipment may be located at the head of the longwall mining apparatus. This equipment, which may be housed in a unit known as the "head gate" or "main gate," typically includes the primary drive for the AFC, which is known as the "head drive" or "main drive." Similarly, equipment may be housed at the tail of the longwall, in the tail gate. The tail gate may include an auxiliary or "tail drive" for the AFC.

The AFC itself may be made of a series of line segments. Each segment may have a flat pan and contoured sidewalls. The sidewall may have a groove or contour above the pan and a second groove or contour below the pan, giving it a cross-section similar to an upper case Greek letter sigma. Flight bars, with their ends contoured to slide within the grooves of the sidewall, may be pulled along the upper surface of the pan by chains. Coal may be pulled along the AFC by the flights bars and delivered to the main gate. From the main gate, the flight bars may travel to the tail gate and tail drive by sliding along the grooves located underneath the pan.

While this system is efficient, it is subject to a great deal of mechanical and frictional stresses during normal operations. When there is a failure anywhere within the longwall mining apparatus, the entire operation must be shut down while a replacement or repair is effected. For example, a failure of a component within the tail drive of the AFC will result in a shut down of the entire longwall mining operation, so that the malfunctioning unit can be repaired separately from the other components of the mining operation. Because longwall mining is such an efficient method, downtime may result in the loss of hundreds or thousands dollars in revenue each minute.

In general, in the tail drive of an AFC, the bottom of the spool (or sprocket) may be aligned with the pans, resulting in the top of the spool being higher than the pans. In this implementation, the flight bars and chains must travel from the top of the spool down to the pans. A top sigma directs the flight bars down to the pans. In so doing, the flight bars contact the underside of the top sigma, resulting in tremendous wear on the sigma in this section. The friction caused by the vertical movement of the flight bars on the underside of the top sigma may be great and may result in the sigma being one of the more frequently repaired components of an AFC. When the wear becomes too great, the entire longwall mining apparatus must be shutdown while the sigma is repaired or replaced.

Accordingly, there is a need for effecting replacement of damaged or malfunctioning parts that minimizes downtime for the mining operation.

SUMMARY OF THE PRESENT DISCLOSURE

The present disclosure meets the foregoing need and allows easy replacement of certain components of the tail drive using a sigma assembly, which results in a significant decrease in downtime and other advantages apparent from the discussion herein.

In one aspect, a replaceable top sigma assembly for mining equipment is provided that includes a face side wall, a gob side wall and a top deck integrally formed with the face side wall and the gob side wall as a single piece. The single piece replaceable top sigma assembly may be cut or made into two pieces for easier transport to the tail gate location. One of the two pieces may comprise a portion of the top deck and an entire gob side wall or an entire face side wall.

In one aspect, a method for attaching a replaceable top sigma assembly to a sprocket module that includes positioning the top sigma assembly in alignment with a portion of a sprocket module, inserting a fore-end of the top sigma assembly into the portion of the sprocket module and inserting a locating pin through a wall of the sprocket module and into a wall of the top sigma assembly.

In one aspect, a system for an armored face conveyor (AFC) is provided that includes a tail drive connectable to a conveyor assembly of the AFC, a single monolithic top sigma assembly configured to be replaceably connected to the tail drive without welding, wherein the a single monolithic top sigma assembly includes a pair of spaced-apart top rails, a top deck joining the pair of spaced-apart top rails, at least one side panel extending downwardly from at least one spaced-apart top rail and configured to be connectable to a sprocket module of a tail drive, wherein the pair of spaced-apart top rails are configured with a radius to conform with a radius of a mating sprocket module, and the single monolithic assembly.

Additional features, advantages, and embodiments of the present disclosure may be set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

The accompanying drawings, which are included to provide a further understanding of the present disclosure, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced. In the drawings.

DETAILED DESCRIPTION OF THE PRESENT DISCLOSURE

Figure 1:
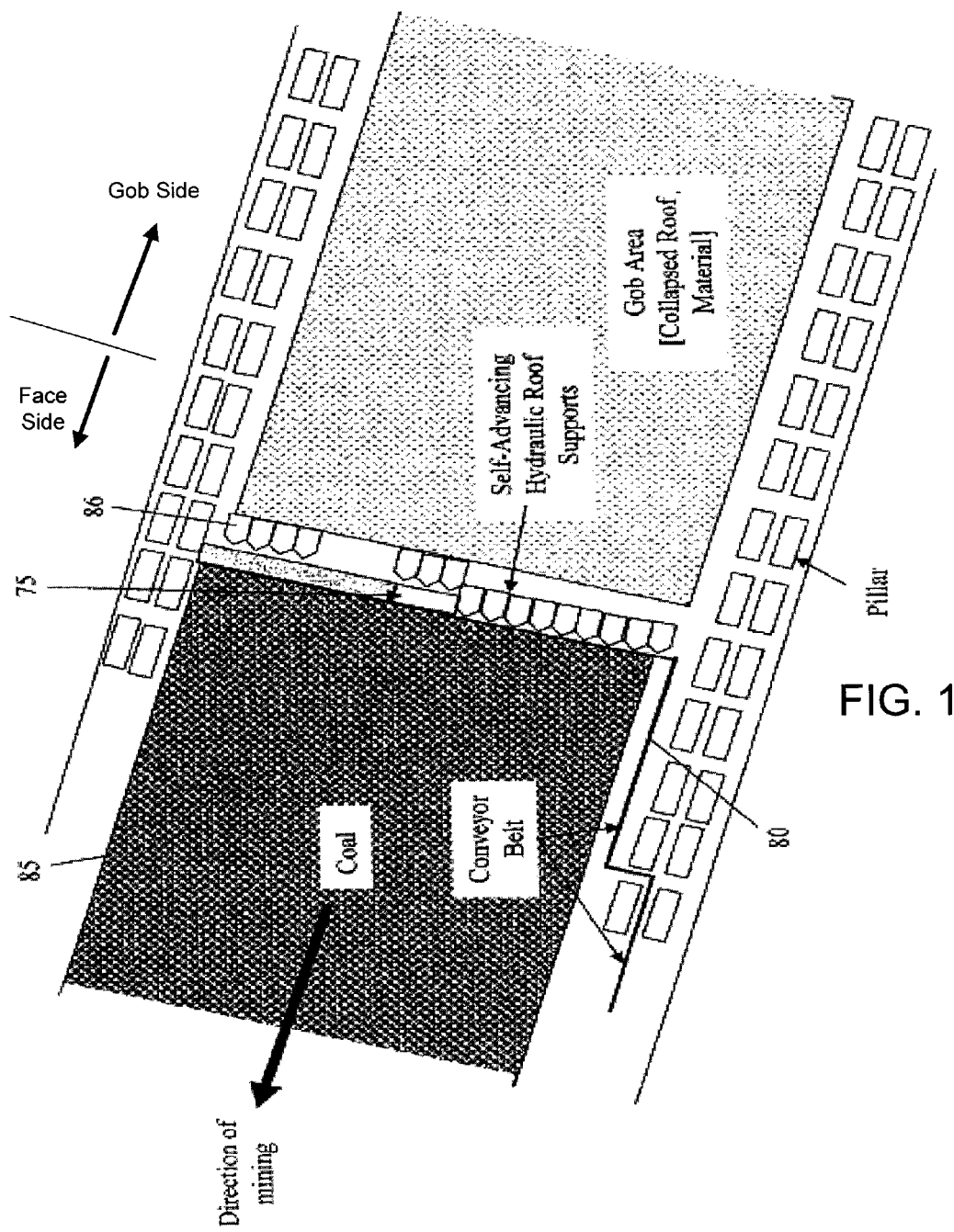
FIG. 1 illustrates an example of a longwall operation environment.

The embodiments of the present disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the features of the present disclosure. The examples used herein are intended merely to facilitate an understanding of ways in which the present disclosure may be practiced and to further enable those of skill in the art to practice the principles of the present disclosure. Accordingly, the examples herein should not be construed as limiting the scope of the present disclosure, which is defined solely by the appended claims and applicable law. Moreover, it is noted that like reference numerals represent similar parts throughout the several views of the drawings.

FIG. 1 illustrates an example of a longwall operation environment, including an armored face conveyor (AFC) 75, a conveyor belt 80, and self-advancing hydraulic roof supports 86. The AFC 75 may be positioned to remove coal 85 along a face of the coal 85. The conveyor belt 80 may be positioned to carry sheared coal from the AFC 75 to a location for transport to the mine surface. The self-advancing hydraulic roof supports 86 may be employed to maintain roof support over and/or near the AFC 75 and portions of conveyor 80.

Figure 2:
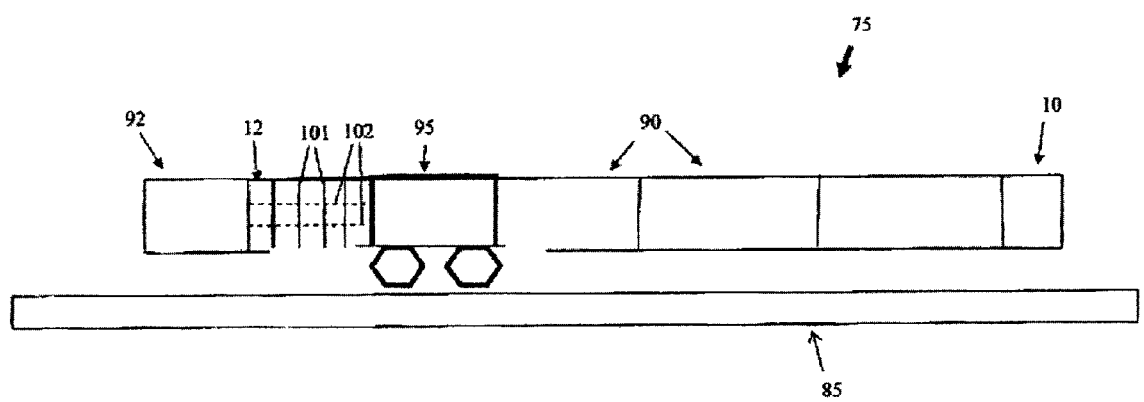
FIG. 2 illustrates a generalized armored face conveyor and related equipment.

FIG. 2 illustrates a generalized AFC 75. The AFC 75 includes a head gate 92, a pan 12, a plurality of flight bars 101, one or more chains 102, a shearer main body 95, a trough pan assembly 90 and a tail drive 10. As coal 85 is removed from the face of a coal seam by one or more shearers 95 that may ride on the AFC 75, the coal falls to the AFC 75. The AFC 75 may comprise a scraper chain conveyor (conveyor assembly) that includes a series of flight bars 101 pulled over pans 12 by one or more chains 102. The flight bars 101 may move the coal along the pans 12 to the head gate 92, where the coal 85 may be deposited onto the main conveyor 80 for transport to the surface. The head gate 92 may contain the main drive for the AFC 75. At the opposite end of the longwall mining apparatus, the tail gate may include a secondary drive, or tail drive 10, for the AFC 75.

After the AFC 75 has deposited coal onto the main conveyor 80 at the head gate 92, the flight bars 101 and chains 102 must return to the tail drive 10. The flight bars 101 and chains 102 may make this return trip by traveling underneath the trough pan assembly 90 of the AFC 75. At the tail drive 10, the flight bars 101 and chains (e.g., continuous chains)102 may wrap around, for example, a spool (or sprocket, such as, e.g., sprocket 11) to travel from one end to the other end of the AFC 75 and to reverse direction back towards the crusher segment 95. The spool may be, for example, a spool, a sprocket, a drum, or the like.

In an AFC 75 having a tail drive 10 with traditional permanently welded sigmas, replacement of the permanently welded sigmas can take multiple shifts and result in thousands of dollars of lost revenue. Current replaceable sigmas generally lack robust mounting arrangements, which often get deformed and rendered unusable due to the tremendous forces applied during mining operations. As a result, existing replaceable sigma designs usually end up being fully welded in place, which defeats the purpose of a replaceable sigma.

Figure 3:
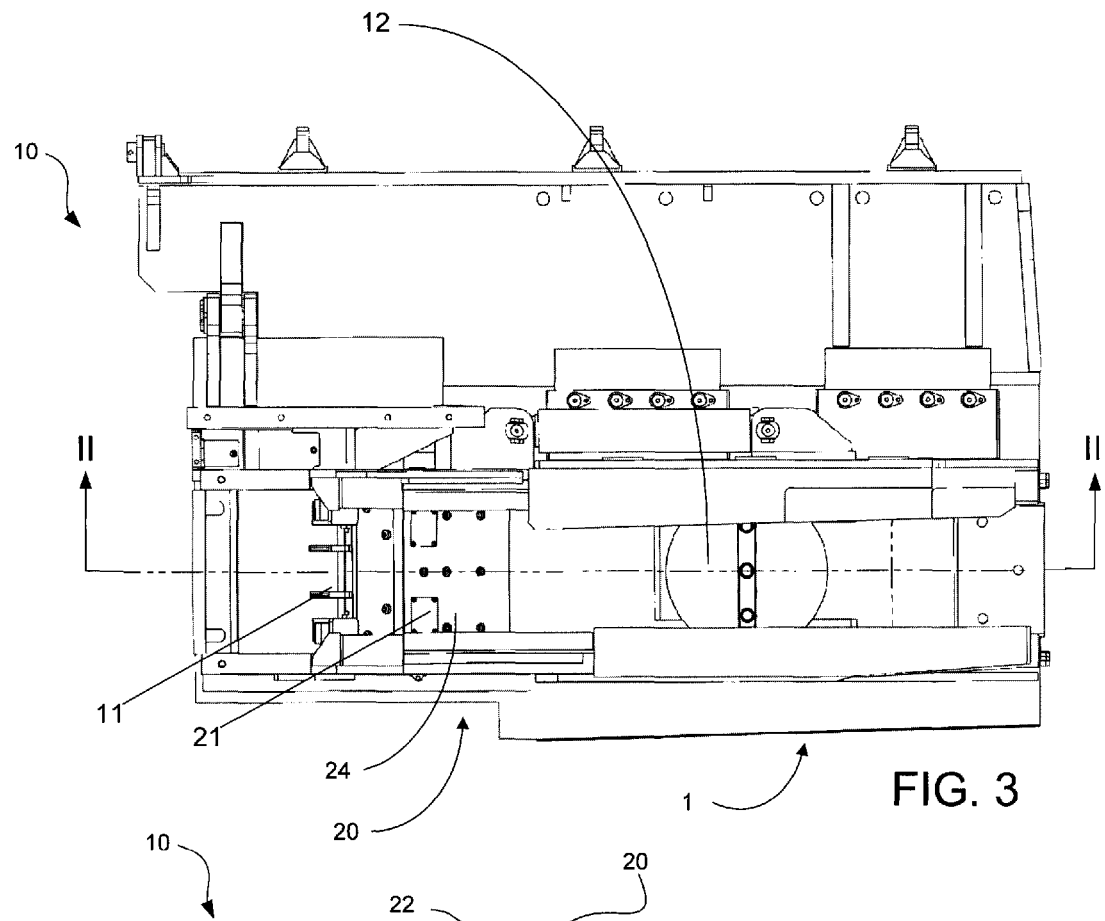
FIG. 3 shows a top view of a tail drive with a replaceable sigma assembly, configured according to the present disclosure.
Figure 4:
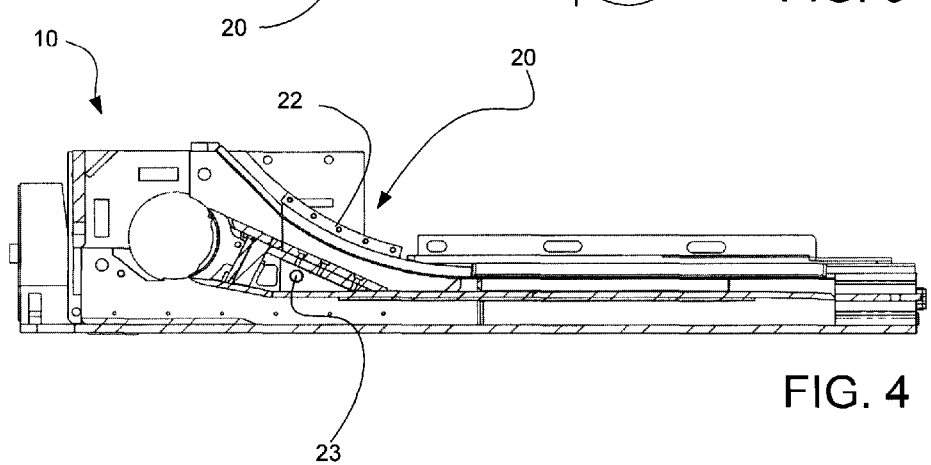
FIG. 4 shows a cutaway along line II of the tail drive in FIG. 3.

FIG. 3 shows a tail drive that is configured according to the present disclosure, indicated generally by 10. The tail drive 10 may be connectable to a conveyor assembly of the AFC 75. FIG. 4 shows a cutaway view of the tail drive 10 along the line II in FIG. 3. The tail drive 10, according the present disclosure, comprises a replaceable top sigma assembly 20 and a sprocket module 1. The top sigma assembly 20 is removably affixed to the sprocket module 1. The sprocket module 1 may include a sprocket 11 for driving and/or tensioning the chains 102 of the AFC 75, as well as the pan 12.

The replaceable top sigma assembly 20, according to the present disclosure, may include one or more access doors 21, a positioning and retention mechanism, a gob side wall 4 (shown in FIG. 5A), a face side wall 7 (shown in FIG. 5A), and a top deck 24. The gob side wall 4, the face side wall 7, and the top deck 24 are formed as a single unit or piece. The positioning and retention mechanism may include a hold-down wedge 22 and one or more locating pins 23 (shown in FIG. 6). The hold-down wedge 22 is configured to engage and help secure the top sigma assembly 20 to the sprocket module 1. The locating pin(s) 23 is configured to pass through an opening 231 (shown in FIG. 6) in a side wall of the sprocket module 1 and through an opening 232 (shown in FIG. 6) in the face side wall 7 of the top sigma assembly 20. The access door 21 may be removable from the top deck 24 and/or the sprocket module 1 to provide access to an opening 111 in the top deck (shown in FIG. 6) and an opening 112 in the sprocket module 1, which may be used for inspection and repair of components under the replaceable top sigma assembly 20, for example, in the sprocket module 1. The access door 21 may also permit access to the locating pin 23 and sprocket grease hoses of the tail drive 10. The hold-down wedge 22 is configured to be affixed on the gob side 4 of the replaceable top sigma assembly 20, so as to position and hold the top deck 24 in proper alignment and position with respect to the sprocket module 1. The hold-down wedge 22 may provide rugged or robust retention of the replaceable top deck 24, while remaining easy to remove when a replacement is needed.

The replaceable top sigma assembly 20 may be made as a single preformed integral piece by, for example, casting the entire structure as one piece, or by prewelding the gob side wall 4, the face side wall 7, and the top deck 24 as a single piece. The replaceable top sigma assembly 20 may be stored and retrieved for transport to a tail gate location when, for example, a repair or replacement of a component in the tail drive is found to be necessary or desirable. The replaceable top sigma assembly 20 may be made from any high strength material that is capable of withstanding the harsh conditions experienced during operation. The material may include, for example, high strength steel, titanium, or the like. The portions of the replaceable top sigma assembly 20 that may experience the most wear may include overlay plates (not shown), ceramic materials, or the like, on (or over) the wear surfaces. An example of wear surfaces include the surfaces opposite the rail portions 18. The replaceable top sigma assembly 20 is configured to be able to withstand a chain wreck.

The single piece replaceable top sigma assembly 20 may be preformed as two pieces (e.g., by cutting a single piece into two pieces, or making two separate pieces capable of interlocking each other) for easier transport to the tail gate location. One of the two pieces may comprise a portion of the top deck 24 and an entire gob wall 4 or an entire face wall 7. In this regard, the two top deck portions may be configured to interlock when the two pieces of the replaceable top sigma assembly 20 are installed in the sprocket module 1. The two deck portions may have, for example, portions that are configured like puzzle pieces (not shown), which engage and lock to form a complete top deck 24. The interlocking portions of the top deck of the two halves of the top sigma assembly 20 may have any shape, including, for example, a wedge shape, a Z shape, a square shape, or any other shape that provides interlocking by, for example, interleaving sections of the top deck portions of the two halves of the replaceable top sigma assembly 20.

The locating pin(s) 23 may be used to ensure that the top sigma assembly 20 is properly and securely aligned with the surrounding guide path and sigma sections. An improperly aligned replacement top sigma assembly 20 may result in further damage to the tail drive 10 and a concomitant increase in downtime, which is highly undesirable.

Figure 5A:
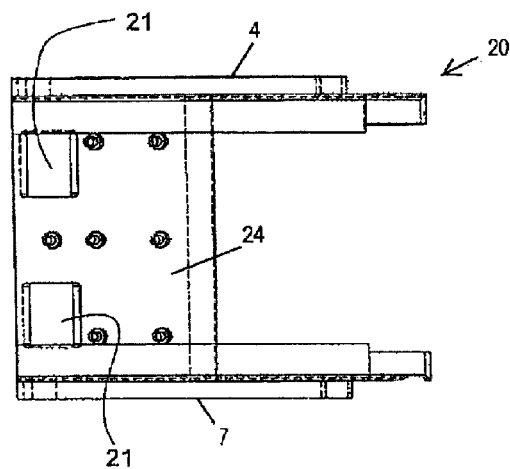
FIG. 5A is a top view of a replacement sigma assembly, configured according to the present disclosure.
Figure 5B:
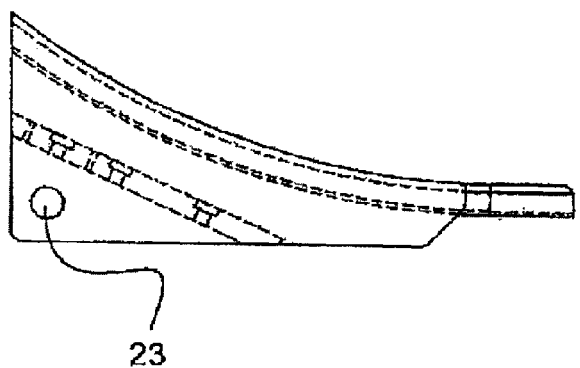
FIG. 5B is a side view of the replacement sigma assembly of FIG. 5A.
Figure 5C:
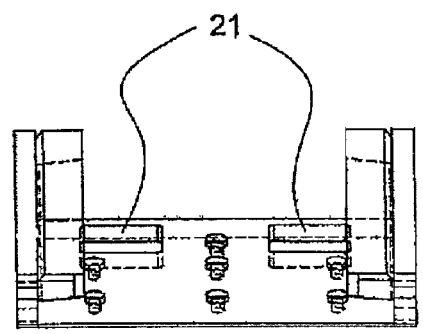
FIG. 5C is a rear view of the replacement sigma assembly of FIG. 5A.

FIGS. 5A-5C show various views of the top sigma assembly 20, constructed according to the disclosure. In particular, FIG. 5A is a top view of the top sigma assembly 20, FIG. 5B is a side view of the top sigma assembly, and FIG. 5C is a rear view of the top sigma assembly 20. As noted earlier, the replaceable top sigma assembly 20, including the gob side 4, the face side 7, the curved portions 18, and top deck 24, is formed as one removable unit, which is manufactured as a single unit.

The top sigma assembly 20 may include robust mounting support to aid it in withstanding the forces applied during mining operations. The replaceable top sigma assembly 20 may be configured as a profile constructed as one piece by a process, such as, for example, casting, welding, or the like. In the case of casting, the entire replaceable top sigma assembly 20 may be cast as one piece. The rail portions of the replaceable top sigma assembly 20 may be separately formed by a process, such as, for example, rolling (hot or cold), forming (hot or cold), casting, forging, or the like, which may then be welded into the top sigma assembly 20. The location of the locating pins 23 and the geometry of the replaceable top sigma assembly 20, including placement of the deck bolts, may allow the resultant of the chain forces to reduce the tensile load on the deck bolts. The design may further provide for easy pivoting removal when replacement due to wear is required.

Figure 6:
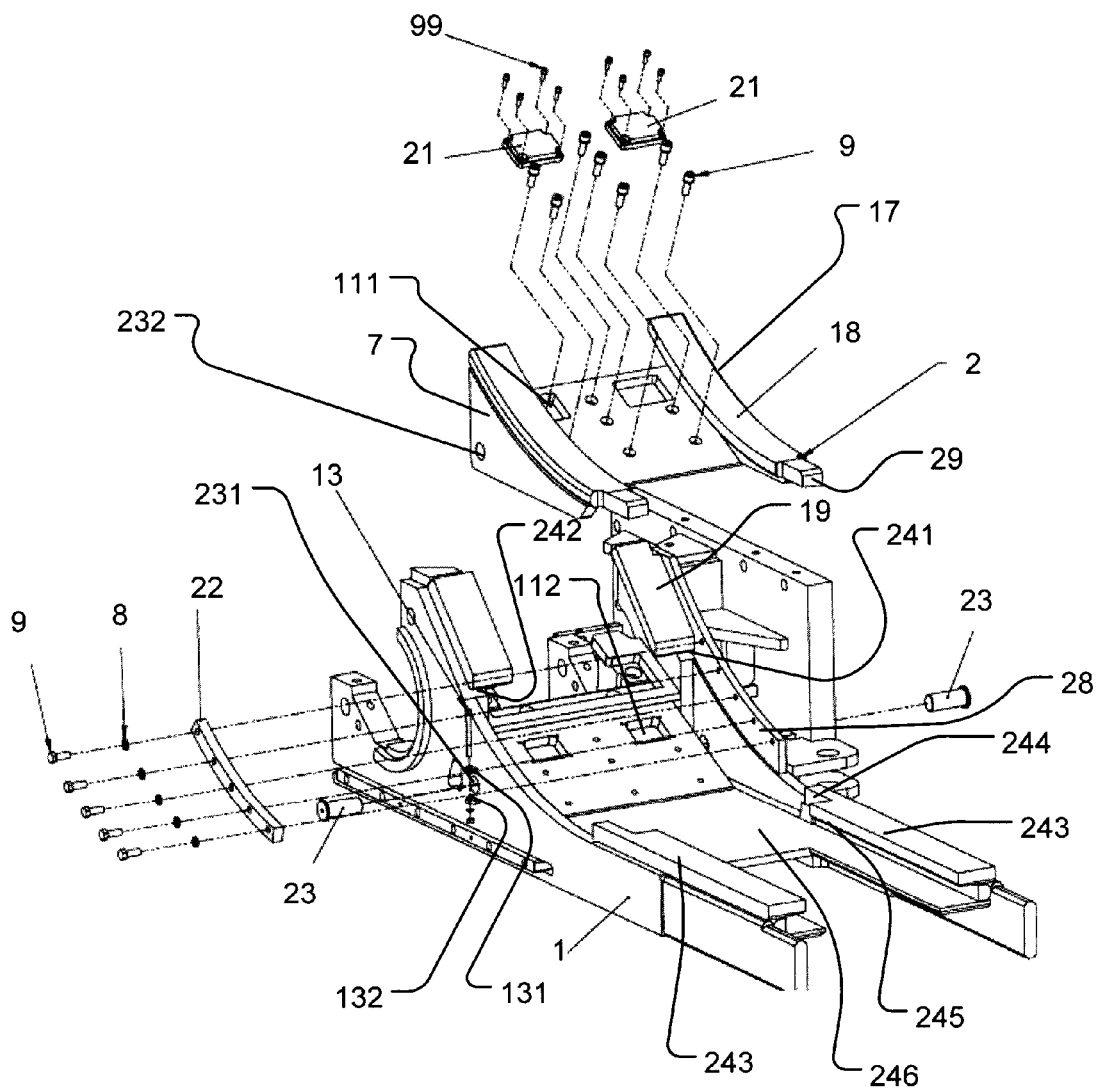
FIG. 6 is an exploded view of a replacement sigma removed from a tail drive, according to the present disclosure.

FIG. 6 shows an exploded view of an example of a tail drive 10, including the replacement top sigma assembly 20 and sprocket module 1, according to the principles of the present disclosure. The replacement top sigma assembly 20 is shown to be replaceably removed from the sprocket module 1 of the tail drive 10. As seen, the access doors 21 may be affixed to the top deck 24 via a plurality of fasteners 99. The top sigma assembly 20 may include a pair of curved rail portions 18 (sigma tops), which may be configured with a radius to permit matching the rail portions 19, 243 of the rails of the sprocket module 1 when installed. The curved rail portions 18 may be configured with end arms 29 to pass through cut-outs 244 of the rail portions 243 to engage a corresponding pair of guides 245 formed in the rail portions 243. The bottom of the top sigma assembly 20 may be configured to engage and rest on top of a plate 246 in the sprocket module 1. The sprocket module 1 may further include a pair of stops 241, 242 that are configured to engage and support corresponding bottom portions of the top sigma assembly 20. The sprocket module may include a plurality of fasteners or recesses that are configured to receive and engage fasteners 9.

When the replaceable top sigma assembly 20 is set into the sprocket module 1, the locating pin(s) 23 may be inserted through an opening 231 in the side wall of the sprocket module 1 and into and through an opening 232 in the face side wall 7 (and/or gob side wall 4). During insertion of the top sigma assembly 20 into the sprocket module 1, the outer surface of the face side wall 7 will face the inner surface of the corresponding side wall of the sprocket module 1, and the outer surface of the gob side wall 4 will face the inner surface of the corresponding side wall of the sprocket module, so that both the face side wall 7 and the gob side wall 4 will be positioned within the recess formed by the side walls of the sprocket module 1.

After the locating pin(s) 23 have been inserted into and through the openings 231, 232, a locking pin 13 may be inserted through, for example, a pair of hoops (or keyed protrusions) 131, 132, thereby securing the locating pin 23 in position. Each of the locating pins 23 may have an annual head portion that has a larger diameter than the rest of the locating pin, so as to prevent the pin 23 from passing completely through the opening 231. The locking pins 13 (or similar devices) may be inserted into and through the hoops 131, 132, which may be provided on each side of the sprocket module 1 and positioned to keep the locating pins 23 positioned in place and to prevent the locating pins 23 from disengaging, but still allowing for easy removal of the locating pins 13 for release of the replaceable sigma 20 for its removal.

Alternatively, the locating pins 23 may have a substantially uniform diameter along the entire length of the pin. In this case, the top sigma assembly 20 may be configured with a stop (not shown) to prevent the locating pins 23 from passing completely through the opening 232.

The locating pins 23 may include a hole at one end, so that a locking pin (not shown) may be inserted into the locating pin 23 after it has been inserted through the openings 231, 232. In this case, the locking pin (not shown) may be inserted via the access doors 21.

To secure the replaceable top sigma assembly 20 to the sprocket module, a race module retaining portion 28 may be attached to or integrally formed with the gob side of the sprocket module 1. The race module retaining portion 28 is configured to engage the hold-down wedge 22. The race module retaining portion 28 may include a plurality of fasteners (not shown) or recesses that are configured to engage and hold a plurality of fasteners 8, 9, so as to securely affix the hold-down wedge 22 to the race module retaining portion 28.

Figure 7:
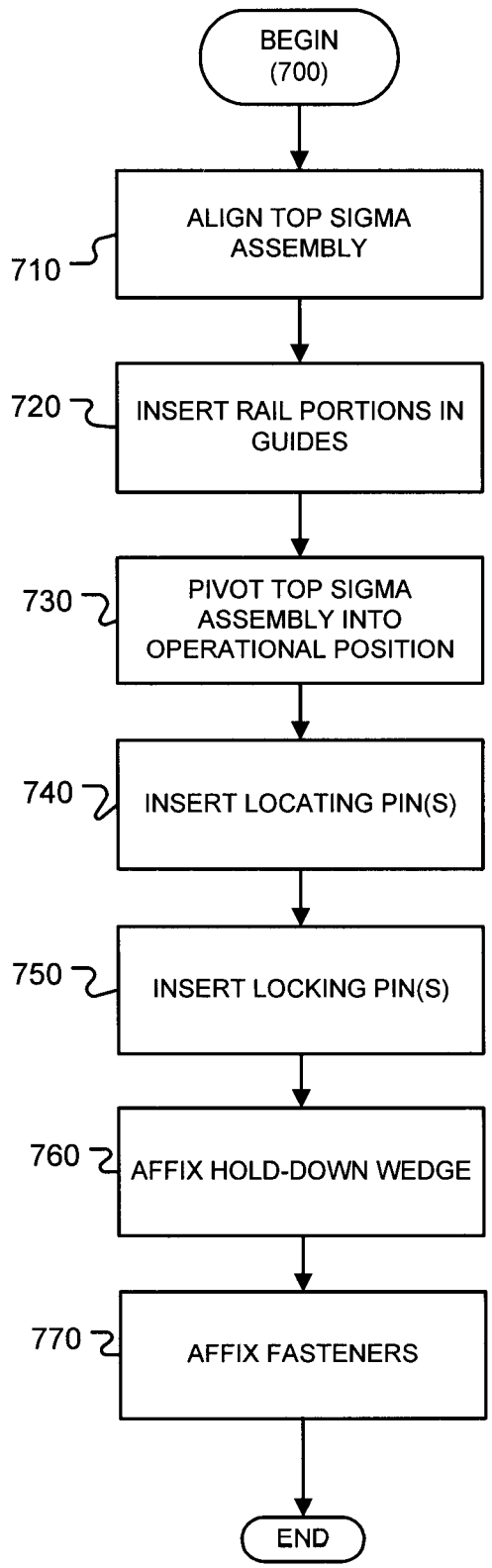
FIG. 7 shows an example of a process for installing a top sigma assembly of FIG. 5A in a tail drive, according to the principles of the disclosure.

FIG. 7 shows an example of a process 700 for replacing a top sigma assembly 20 in a tail drive 10, according to the principles of the disclosure.

Referring to FIGS. 6 and 7, after a damaged top sigma assembly is removed using a process that is the inverse of the process 700 shown in FIG. 7, the replacement top sigma assembly 20 may be aligned with the sprocket module 1, so that the face side wall 7 and the gob side wall 4 are positioned between the side walls of the sprocket module 1 (Step 710). The top sigma assembly 20 may be tilted and the pair of rail portions 29 on the fore-end of the top sigma assembly 20 may be lowered through the cut-outs 244 onto the plate 246 and slidably inserted into the guides 245 formed in the rail portions 243 (Step 720). The aft-end of the top sigma assembly 20 may be pivoted toward the sprocket module 1 and positioned in its operational position (Step 730). A locating pin 23 may be inserted through the opening 231 in the side wall of the sprocket module 1 and into and through the opening 231 in the face side wall 7 (Step 740). Another locating pin 23 may be similarly inserted through the other side wall of the sprocket module 1 and gob side wall 4 of the top sigma assembly 20. A locking pin 23 may be inserted through the pair of hoops 131, 132 to secure the locating pin 23 in place (Step 750). Another locking pin 23 may be similarly inserted through the pair of hoops 131, 132 on the gob wall 4 side of the tail drive 10. A hold-down wedge 22 may be positioned atop of the top sigma assembly 20 and attached to the race module retaining portion 28 (Step 760). The hold-down wedge 22 and/or the top deck 24 may be secured to the sprocket module 1 via the plurality of fasteners 8, 9 (Step 770). It is noted that Steps 760 and 770 may be performed before Step 740.

In the case where the top sigma assembly 20 consists of two preformed portions (not shown), where each preformed portion comprises a portion of the top deck 24 preformed with the gob side wall 4 or face side wall 7, as described earlier, the process 700 (including Steps 710 to 770) may be repeated for each of the two top sigma assembly portions.

The replaceable top sigma assembly 20 of the present disclosure may be configured as a monolithic module of a top race including face and access doors 21. The replaceable top sigma assembly 20 may be configured to join the gob side and face side, sigma tops and sides, and top deck as one removable and relatively easily replaceable unit that has robust mounting which may withstand the chain/flight forces. The replaceable top sigma assembly 20 requires no welding to the tail drive assembly 20 and is configured to withstand the harsh wear and tear of the friction applied to the underside of the replaceable top sigma assembly while in use, without any welding. The replaceable top sigma assembly 20 is relatively quick to change-out compared to traditional type sigmas that are typically welded to the tail drive and typically comprise multiple separate individually replaceable components.

It is noted that the fasteners described herein, including fasteners 8, 9, 99, may include, but are not limited to, for example, bolts, nuts, washers, screws, rivets, pins, rods, or the like.

While the present disclosure has been described in terms of exemplary embodiments, those skilled in the art will recognize that the present disclosure can be practiced with modifications in the spirit and scope of the appended claims. In particular, the present disclosure has been described in terms of replacing portions of the tail drive of an armored face conveyor. Those skilled in the art will readily see that the principles and teachings of the present disclosure may be easily applied to other segments, portions, and areas of an AFC, such as, e.g., the ramp pan. Furthermore, the examples given above are merely illustrative and are not meant to be an exhaustive list of all possible designs, embodiments, applications or modifications of the present disclosure.

What is claimed is:

1. A system for an armored face conveyor (AFC), comprising:
   a tail drive connectable to a conveyor assembly of the AFC;
   a single monolithic top sigma assembly configured to be replaceably connected to the tail drive without welding, wherein the single monolithic top sigma assembly comprises:
   a pair of spaced-apart top rails;
   a top deck joining the pair of spaced-apart top rails;
   at least one side panel extending downwardly from at least one spaced-apart top rail and configured to be connectable to a sprocket module of a tail drive,
   wherein the pair of spaced-apart top rails are configured with a radius to conform with a radius of a mating sprocket module, and the single monolithic assembly.

2. The system of claim 1, wherein the top deck comprises an access opening for permitting inspection of equipment located under the top deck.

3. The system of claim 2, further comprising an access door to close the access opening.

4. The system of claim 1, wherein the single monolithic top sigma assembly is configured to be connectable to the sprocket module of the tail drive using a location pin that is insertable through the a wall of the sprocket module into said at least one side panel.

5. The system of claim 1, wherein at least one of the pair of spaced-apart top rails is configured with an end arm that mates with a guide in the sprocket module for aligning and aiding in holding the single monolithic assembly with the sprocket module.

6. The system of claim 1, wherein the conveyor assembly comprises flight bars and chains.

7. The system of claim 1, further comprising a hold-down wedge configured to be attachable to the sprocket module.

8. The system of claim 7, wherein the hold-down wedge is configured to be attachable on a gob side of the replaceable top sigma assembly and a gob side of the sprocket module.

9. The system of claim 1, wherein the at least one side panel extending downwardly from at least one spaced-apart top rail is configured to be connectable to a sprocket module of a tail drive by at least one location pin.

\* \* \* \* \*